US009684645B2

(12) United States Patent
Beavers et al.

(10) Patent No.: US 9,684,645 B2
(45) Date of Patent: Jun. 20, 2017

(54) SUMMARY VIEWS FOR EBOOKS

(71) Applicant: Google Inc., Mountain View, CA (US)

(72) Inventors: Adeline Beavers, Mountain View, CA (US); Marco Paglia, San Francisco, CA (US); Nathan Stuart Streu, San Francisco, CA (US); Chorong Johnston, Mountain View, CA (US); Brian Armstrong, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 457 days.

(21) Appl. No.: 14/450,795

(22) Filed: Aug. 4, 2014

(65) Prior Publication Data
US 2016/0034430 A1 Feb. 4, 2016

(51) Int. Cl.
*G06F 3/0481* (2013.01)
*G06F 17/24* (2006.01)
(Continued)

(52) U.S. Cl.
CPC .......... *G06F 17/241* (2013.01); *G06F 3/0483* (2013.01); *G06F 17/212* (2013.01);
(Continued)

(58) Field of Classification Search
CPC .......... G06F 3/00; G06F 3/048; G06F 3/0481; G06F 3/0482; G06F 17/2235;
(Continued)

(56) References Cited

U.S. PATENT DOCUMENTS 7,689,933 B1   3/2010  Parsons
9,256,588 B1 *  2/2016  Moscovich ........... G06F 17/242
(Continued)

FOREIGN PATENT DOCUMENTS

JP   2006-338142 A   12/2006
JP   2012-008644 A   1/2012

OTHER PUBLICATIONS

PCT International Search Report and Written Opinion for PCT/US2015/036962, Sep. 25, 2015, 10 Pages.
(Continued)

*Primary Examiner* — Xiomar L Bautista
(74) *Attorney, Agent, or Firm* — Fenwick & West LLP (57) ABSTRACT

An ebook is represented as a plurality of ebook pages associated with a plurality of segments. A summary view command is received, the summary view command requesting a particular type of summary view of a plurality of available summary views. One or more ebook pages are identified, for a summary view based in part on the requested type of summary view, and page thumbnails are generated for each of the identified one or more ebook pages. The generated page thumbnails are grouped by segment, using the plurality of segments. A summary view graphical user interface (GUI) is generated for the requested type of summary view using the grouped page thumbnails, the summary view GUI vertically listing one or more segments, of the plurality of segments, and horizontally listing page thumbnails associated with the one or more segments, and the summary view GUI is displayed.

20 Claims, 8 Drawing Sheets

(51) Int. Cl.
*G06F 3/0483* (2013.01)
*G06F 17/21* (2006.01)
*G06F 17/22* (2006.01)
*G06F 17/30* (2006.01)

(52) U.S. Cl.
CPC ........ *G06F 17/217* (2013.01); *G06F 17/2241* (2013.01); *G06F 17/30719* (2013.01)

(58) Field of Classification Search
CPC ........ G06F 17/241; G06F 17/22; G06F 17/24; G06F 17/27; G06F 17/30; G06F 17/30067
See application file for complete search history.

(56) References Cited

U.S. PATENT DOCUMENTS

| | | | |
|---|---|---|---|
| 2002/0116420 A1 | 8/2002 | Allam et al. | |
| 2012/0036431 A1* | 2/2012 | Ito | G06F 17/2235 715/273 |
| 2012/0131464 A1* | 5/2012 | Penner | G06F 17/24 715/732 |
| 2012/0137246 A1* | 5/2012 | Pyo | G01C 21/362 715/776 |
| 2013/0055077 A1* | 2/2013 | Hagel-Sorensen | G06F 17/212 715/273 |
| 2013/0073932 A1 | 3/2013 | Migos et al. | |
| 2013/0083069 A1* | 4/2013 | Yakishyn | G06F 3/0488 345/634 |
| 2013/0191728 A1* | 7/2013 | Mckinney | G06F 17/211 715/243 |
| 2013/0232409 A1* | 9/2013 | Cranfill | G06F 17/30011 715/256 |
| 2014/0052741 A1 | 2/2014 | Yoshida et al. | |
| 2014/0365859 A1* | 12/2014 | Migos | G06F 17/241 715/230 |
| 2015/0177933 A1* | 6/2015 | Cueto | G06F 3/0483 715/776 |
| 2015/0324074 A1* | 11/2015 | Van Winkle | G06F 3/0483 715/776 |

OTHER PUBLICATIONS

Pappas P., "How-To Tips for Working With iBooks Author", Ed. Tech., Oct. 10, 2012, 32 pages, [online], [retrieved Feb. 23, 2015], Retrieved from the Internet, < http://www.peterpappas.com/2012/10/how-to-tips-for-working-with-ibooks-author.html>.

* cited by examiner

SUMMARY VIEWS FOR EBOOKS

BACKGROUND

Field of Disclosure

This disclosure relates to the field of displaying information via a graphical user interface, and specifically to generating graphical user interfaces showing summary views that facilitate navigation of ebooks.

Description of the Related Art

Many users utilize their digital devices to read digital content such as novels, news articles, short stories, etc., view videos, view pictures, or more generally interact with some sort of displayed content. In many cases, the digital content includes a table of contents that lists the names of sections (e.g., chapters, index, etc.) of the digital content organized in the order in which the sections appear. If a user selects a particular section of the digital content, the digital device presents the beginning of that section to the user. However, always navigating to a beginning of a selected section can be somewhat imprecise if the user actually is looking for a specific location or topic within the section. Moreover, most digital devices require a user to navigate to dedicated screens for annotated pages (e.g., bookmarked, highlighted, etc.), and a user is not able to discern from the table of contents what and/or if any pages in the ebook have been annotated.

SUMMARY

The above and other needs are met by a computer-implemented method, a non-transitory computer-readable storage medium storing executable code, and a system for generating graphical user interfaces showing summary views that facilitate navigation of ebooks.

One embodiment of the computer-implemented method for generating graphical user interfaces showing summary views that facilitate navigation of ebooks, comprises representing an ebook as a plurality of ebook pages associated with a plurality of segments. A summary view command is received from a user, the summary view command requesting a particular type of summary view of a plurality of available summary views. One or more ebook pages, of the plurality of ebook pages, are identified for a summary view based in part on the requested type of summary view. Page thumbnails are generated for each of the identified one or more ebook pages, wherein the page thumbnail is associated with the same segment as the associated ebook page. The generated page thumbnails are grouped by segment, using the plurality of segments. A summary view graphical user interface (GUI) is generated for the requested type of summary view using the grouped page thumbnails, the summary view GUI vertically listing one or more segments, of the plurality of segments, and horizontally listing page thumbnails associated with the one or more segments; and the summary view GUI is displayed.

One embodiment of a non-transitory computer-readable storage medium storing executable computer program instructions for generating graphical user interfaces showing summary views that facilitate navigation of ebooks, comprises representing an ebook as a plurality of ebook pages associated with a plurality of segments. A summary view command is received from a user, the summary view command requesting a particular type of summary view of a plurality of available summary views. One or more ebook pages, of the plurality of ebook pages, are identified for a summary view based in part on the requested type of summary view. Page thumbnails are generated for each of the identified one or more ebook pages, wherein the page thumbnail is associated with the same segment as the associated ebook page. The generated page thumbnails are grouped by segment, using the plurality of segments. A summary view graphical user interface (GUI) is generated for the requested type of summary view using the grouped page thumbnails, the summary view GUI vertically listing one or more segments, of the plurality of segments, and horizontally listing page thumbnails associated with the one or more segments; and the summary view GUI is displayed.

One embodiment of a device for generating graphical user interfaces showing summary views that facilitate navigation of ebooks, comprises a processor configured to execute modules, and a memory storing the modules. The modules include a parsing module configured to represent an ebook as a plurality of ebook pages associated with a plurality of segments, and a command detection module configured to receive a summary view command from a user, the summary view command requesting a particular type of summary view of a plurality of available summary views. The modules also include a thumbnail generation module configured to identify one or more ebook pages, of the plurality of ebook pages, for a summary view based in part on the requested type of summary view, and generate page thumbnails for each of the identified one or more ebook pages, wherein the page thumbnail is associated with the same segment as the associated ebook page. The modules also include a grouping module configured to group the generated page thumbnails by segment, using the plurality of segments. The modules also include a view generation module configured to generate a summary view graphical user interface (GUI) for the requested type of summary view using the grouped page thumbnails, the summary view GUI vertically listing one or more segments, of the plurality of segments, and horizontally listing page thumbnails associated with the one or more segments, and display the summary view GUI.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
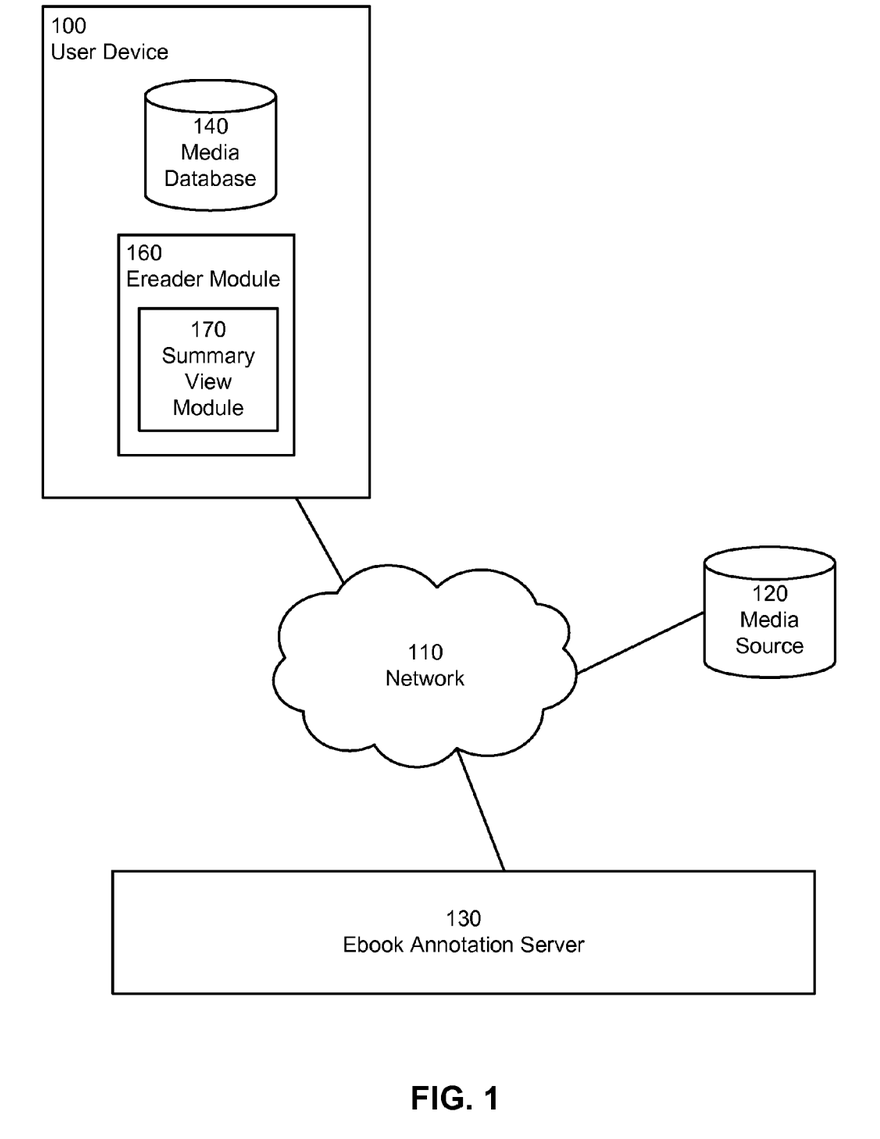
FIG. 1 is a high-level block diagram illustrating an embodiment of an environment for generating graphical user interfaces showing summary views that facilitate navigation of ebooks.

FIG. 1 is a high-level block diagram illustrating an embodiment of an environment for generating graphical user interfaces for summary views that facilitate navigation of ebooks. The environment includes a user device 100 connected by a network 110 to a media source 120 and an ebook annotation server 130. Here only one user device 100, media source 120, and ebook annotation server 130 are illustrated but there may be multiple instances of each of these entities. For example, there may be thousands or millions of user devices 100 in communication with multiple media sources 120 and ebook annotation servers 130.

The network 110 provides a communication infrastructure between the user devices 100, the media sources 120, and the ebook annotation server 130. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The user devices 100 are computing devices that execute computer program modules—e.g., a web browser or other client application—which allow a user to view ebooks, newsfeeds, browse the internet, and generally consume media content. A user device 100 might be, for example, a personal computer, a tablet computer, a smart phone, a laptop computer, a dedicated e-reader, or other type of network-capable device such as a networked television or set-top box.

The media source 120 includes one or more computer servers that provide ebooks to the user devices 100. The media source 120 may be, for example, an ebook retailer, a library, etc. The media source 120 may directly provide an ebook to the user devices 100 via the network 110. In alternate embodiments, the media source 120 may be part of the ebook annotation server 130.

An ebook is an electronic book that includes content and metadata. The ebook content includes an electronic collection of text (and possibly additional types of content such as images and/or sound). For example, the ebook content includes the content of a book such as would be printed on the pages of a traditional paper-based book. All of the text in the collection may be from a single source, or the collection may contain text from different sources. The text may have originated in a traditional paper-based format (e.g., a physical book or newspaper), or it may have originated in a digital format (e.g., electronic files in a format such as Portable Document Format (PDF), EPUB format, or flowing text format). The content of an ebook is divided into segments. A segment is a section of an ebook that is associated with a portion of the content of related pages in an ebook. A segment may be, for example, a chapter, a subsection of a chapter, an index, a map, a bibliography, some other portion of the ebook, or some combination thereof. For example, an ebook can include one segment for each chapter of the ebook, a segment for the index, etc.

The ebook metadata includes bibliographical information about the ebook, such as the ebook identifier, title, author, publication date, edition/version number, number of pages, number of chapters, page thumbnails for pages of the ebook, or some combination thereof. The ebook metadata also includes a list of segments into which the ebook's content is divided. A segment is represented in the list by a segment ID that uniquely identifies the segment within the ebook (e.g., a chapter number).

A user device 100 comprises a media database 140 and an ereader module 160 in one embodiment. In one embodiment these entities are software application modules executing on the user device 100. For example, the modules 140 and 160 may be integrated into a smart phone application executing on a smart phone.

The media database 140 stores information relating to ebooks. Information relating to ebooks includes ebooks, associated metadata, and annotations. Annotation information includes annotation content and annotation metadata. Annotation content, as used herein, is the body of an annotation that is provided by the annotation author to be displayed when the annotation is viewed by the annotation author and/or other readers of an ebook, and can include, for example, text, emphasized portions of text (e.g., highlighted, underlined, italicized, etc.), images, audio recordings, video, or some combination thereof. Annotation metadata, as used herein, is any additional information about the annotation that is stored in the networked computing environment, and may be, for example, the specific ebook and portion thereof to which the annotation corresponds, the identity of the annotation's author, a thumbnail associated with the annotation's author, information about the annotation content (e.g., subject matter), information about the annotation's author, the date and time at which the annotation was created, or some combination thereof.

The ereader module 160 enables a user operating the user device 100 to request (via one or more graphical user interfaces) ebooks from the media database 140 and/or the media source 120. The ereader module 160 may also send an annotations request for annotations associated with the ebook to the ebook annotation server 130. An annotations request includes a user ID and the ebook identifier. For example, the user operating the user device 100 may select an ebook to read from a list of ebook choices displayed via the ereader module 160. The ereader module 160 then sends a request for the selected ebook to the media source 120 and an annotations request associated with the requested ebook to the ebook annotation server 130. The ereader module 160 parses the received ebook into ebook pages based on a size of a display area made available by the user device 100. The user device 180 receives the requested annotations and incorporates them into the displayed ebook content.

The ereader module 160 enables a user operating the user device 100 to read and/or otherwise interact with an ebook. For example, the ereader module 160 may include an interface that allows a user to read a portion of a ebook, bookmark a portion of an ebook, highlight a portion of an ebook, comment on a portion of ebook, view annotation information made by other users about a portion of the ebook, reply to annotation information left by other users in accordance with privacy settings of the user, or some combination thereof. The ereader module 160 stores annotations received from the user as annotation information in the media database 140. In some embodiments, the ereader module 160 provides the annotation information to the ebook annotation server 130, along with a user ID associated with the user and an ebook identifier.

The ereader module 160 allows a user to specify privacy settings to the ebook annotation server 130. Privacy settings control the interactions between other users and the annotation information associated with the user. Privacy settings may, for example, specify which users may view and/or comment on annotation information associated with the user. The privacy settings may be specific to ebooks identified by the user. In some embodiments, the privacy settings may apply to all ebooks associated with the user. Thus, a user is able to control how other users interact with the user's annotation information for an ebook.

The ereader module 160 includes a summary view module 170 that generates one or more summary views of an ebook. Responsive to receiving a summary view command from the user, the ereader module 160 instructs the summary view module 170 to generate a summary view. A summary view is a graphical user interface (GUI) that presents one or more page thumbnails that have been grouped by segment to the user. The summary view displays a summary of ebook content to the user. The summary may be provided and/or illustrated as a group of page thumbnails representing a type of summary of the ebook content. A summary view may be, e.g., a table of contents view, a bookmark view, or a highlights & notes view. Examples of different summary views are discussed in detail below with respect to FIGS. 2B, 2C, and 2D.

The summary view identifies one or more ebook pages for a summary view based in part on the requested type of summary view (e.g., table of contents view, bookmark view, or highlights & notes view). The summary view module 170 generates page thumbnails for the identified ebook pages for the summary view. A page thumbnail is a selectable image of an ebook page which has been scaled down in size, which if selected causes the ereader module 160 to display the ebook page associated with the page thumbnail. In some embodiments, the summary view module 170 may use annotation information in the generation of the page thumbnails, such that, e.g., annotations associated with an ebook page are visible on the page thumbnail. The summary view module 170 identifies segments associated with the generated page thumbnails, and groups the page thumbnails by segment. The summary view module 170 generates a summary view GUI using the grouped page thumbnails. Thus, a summary view GUI for a table of contents may be generated that lists chapters or other segments of the ebook and their associated page thumbnails. Similarly, a summary view GUI for a highlights and notes view may be created that only list segments including page thumbnails associated with annotated ebook pages. Additionally, a summary view GUI for a bookmark view may be created that only list segments including page thumbnails associated with ebook pages that have been bookmarked.

The summary view module 170 then presents the generated summary view GUI to the user. As discussed in detail below with respect to FIGS. 2B-2D, the summary view GUI lists the identified segments in the ebook vertically, and lists the page thumbnails grouped with that segment horizontally below a segment title (e.g., chapter title). A user is able to vertically scroll through segments, and horizontally scroll through individual page thumbnails within each listed segment. Additionally, in some embodiments, the page thumbnail associated with the ebook page that was being displayed by the user device 100 when the summary view command was received is emphasized (e.g., the page thumbnail may be slightly larger than other page thumbnails) in the summary view GUI. Thus, the summary view allows a user to easily navigate through the pages of an ebook by selecting not only a segment of interest to the user, but an exact ebook page within the segment via an associated page thumbnail.

The ebook annotation server 130 includes one or more computer servers that store annotation information from different users. The ebook annotation server 130 receives annotation information, including corresponding user IDs, and ebook identifiers from various user devices 100. The ebook annotation server 130 stores received annotation information indexed to the corresponding user ID and the ebook identifier. Responsive to receiving an annotation request from a particular user device 100, the ebook annotation server 130 retrieves the requested annotation information using the user ID and the ebook identifier, and provides the retrieved annotation information to the user device 100.

The systems disclosed herein generate and present summary views which allow a user to easily and rapidly navigate to precise locations within an ebook. Additionally, different summary views may be presented based on what, if any, annotation information the user is interested in seeing. Moreover, the page thumbnail corresponding to the user's current reading location may be emphasized in the summary view, so that the user is able to easily scroll through various chapters and/or page thumbnails without losing their place in the ebook.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the ebook annotation server 130 and/or the media source 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Turning now to a discussion of the various GUIs of the user device 100 discussed above, FIG. 2A illustrates an example of a GUI 200 displayed by a user device 100 showing an ebook page 202 according to an embodiment. In this embodiment, the ebook page 202 includes a graphic 204 and text 206. The ebook page 202 further includes annotation information, specifically, a highlighted portion 208, a comment thumbnail 210, and a bookmark 212. In alternate embodiments, a user may elect to have some or all of the annotation information not be displayed on the ebook page 202.

Figure 2A:
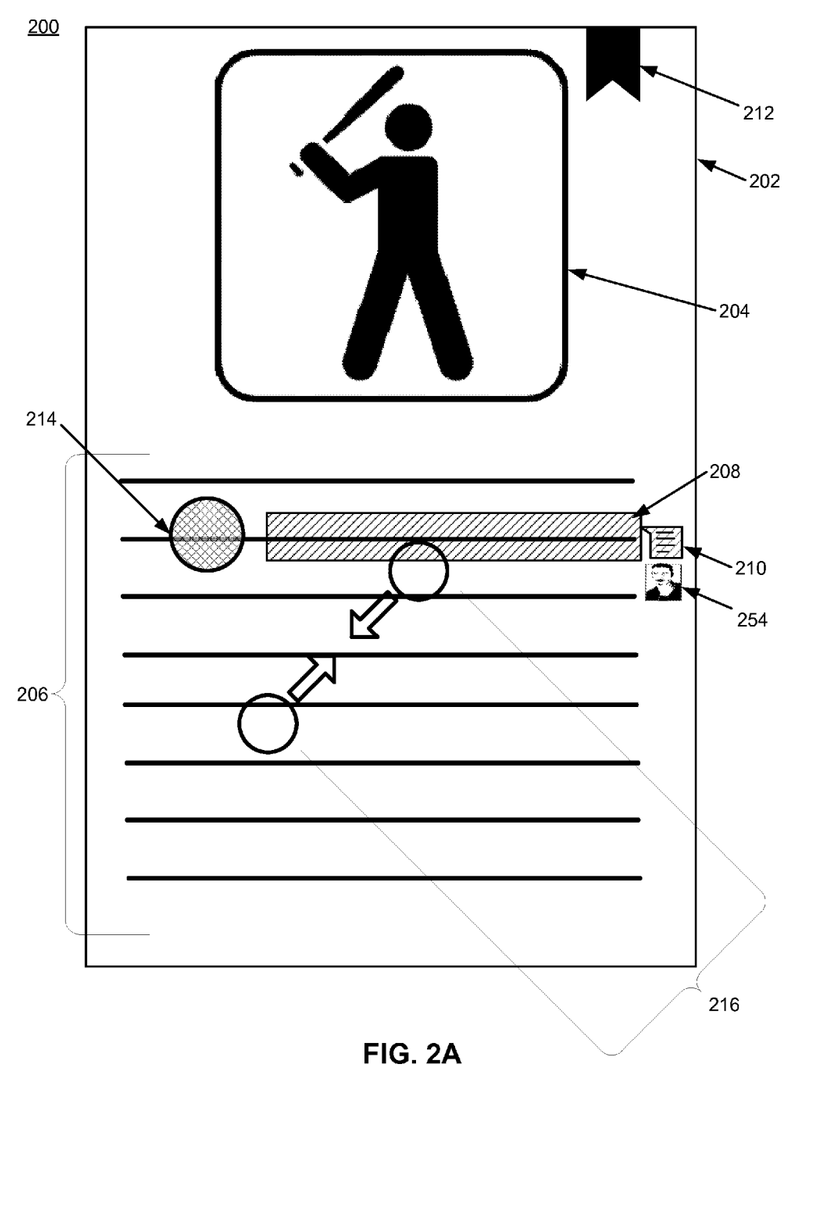
FIG. 2A illustrates an example of a graphical user interface displayed by a user device showing an ebook page according to an embodiment.

In this embodiment, a user may page forward or backward through the ebook using gestures. Gestures are movements made by the user while contacting a touch-screen interface or, e.g., captured via a camera on or coupled to the user device 110. Gestures may include, for example, tapping a portion of the screen, touching a portion of the screen and then dragging the touched portion in a particular direction, touching several places on the screen and bringing the touched portions closer together, etc. A user may page backward in the ebook by swiping horizontally from left to right across the ebook page 202. Likewise, a user may page forward in the ebook by swiping horizontally from right to left across the ebook page 202. In some embodiments, the user may access a table of contents view using a summary view command. A summary view command may be provided to the user device 100 by a tapping gesture 214 the displayed ebook page 202—where a single location on the screen is touched for a short period of time (e.g., less than 0.5 second). A summary view command may also be provided to the user device 100 by a pinching gesture 216—where two fingers in contact with the screen are brought closer together, or some combination thereof. In other embodiments, a summary view command may be provided to the user device 100 via selectable thumbnails, selection of a button on the user device 100, some other selection means, or some combination thereof.

The comment thumbnail 210 is associated with the highlighted portion 208 of the ebook text. As discussed below, with reference to FIG. 2D, the comment thumbnail 210 is indicative of there being one or more comments made that are available to be displayed in a summary view, specifically, the highlights & notes view. As used herein, a comment may also be referred to as a note. The user thumbnail 254 is an image associated with a user who provided some of the annotation information (e.g., the comment thumbnail 210 and/or the highlighted portion 208).

Figure 2B:
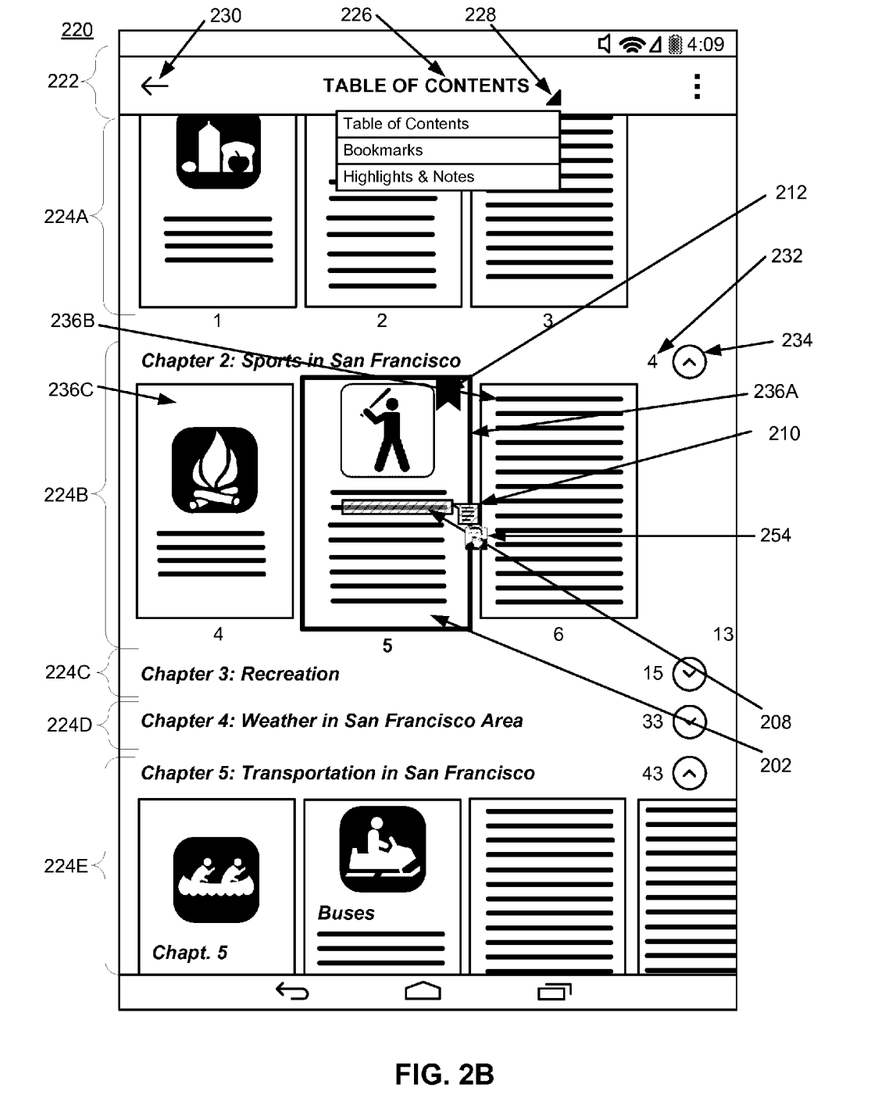
FIG. 2B illustrates an example of a graphical user interface showing a summary view, specifically, a table of contents view according to an embodiment.

FIG. 2B illustrates an example of a GUI 220 showing a summary view, specifically, a table of contents view according to an embodiment. The GUI 220 includes a title bar 222 and a plurality of segments 224A-E.

The segments 224A-E are each associated with one or more page thumbnails, however, only segments 224A, 224B, and 224E are displaying their associated page thumbnails. For example, Chapter 2 of the ebook only has three pages, and accordingly only shows three page thumbnails 236A, 236B, and 236C, each of which are smaller versions of a corresponding ebook page. For example, page thumbnail 236A is a smaller version of the ebook page 202 discussed previously with regard to FIG. 2A. In some embodiments, the scaling is such that the page thumbnail is an exact reproduction of the ebook page, such that the content presented by a page thumbnail is the same content that is presented by its corresponding ebook page. And in some embodiments, some or all of the annotation information associated with an ebook page may be presented on its corresponding page thumbnail. For example, the page thumbnail 236A includes the highlighted portion 208, the comment thumbnail 210, and the bookmark 212. The GUI 200 arranges the displayed segments 224A-E in the ebook vertically. In this embodiment, a user may scroll downward and/or upward through the segments 224A-E using gestures (e.g., swiping downward or upward respectively), such that page thumbnails and/or segments originally outside a display area of the user device 100 are scrolled into the display area.

The segments include a horizontal listing of page thumbnails for each of the segment's associated ebook pages. For example, segments 224A, 224B, and 224E are toggled such that their associated page thumbnails are visible. The user may scroll horizontally through each of the displayed page thumbnails within a segment such that page thumbnails originally outside a display area of the user device 100 are scrolled into the display area. Additionally, the GUI 220 emphasizes the page thumbnail associated with the ebook page that was being presented to the user when the summary view command was received. For example, page thumbnail 236A is slightly larger than other page thumbnails being presented to indicate the ebook page that was being presented to the user when the summary view command was received. Emphasizing the page thumbnail 236A allows a user to navigate the various segments and associated page thumbnails, and easily find and/or return to their previous reading location (e.g., ebook page 202).

The page thumbnails are selectable, and if selected, e.g., via a user tapping on the thumbnail, the GUI 220 displays the ebook page corresponding to the selected page thumbnail. Thus, a user is easily able to discern an exact location within a segment using the page thumbnails within the segment, and navigate directly to the associated ebook page by selecting the corresponding page thumbnail. In some embodiments, the GUI 220 may display or cease displaying page thumbnails associated with a segment 224 based on user input. For example, the GUI 220 includes a toggle button 234 that if selected causes the GUI 220 to cease display of a page thumbnails within a segment.

The title bar 222 identifies the summary view as a table of contents 226. The title bar 222 includes a return thumbnail 230 that, if selected, causes the user device 100 to display what was being displayed by the user device 100 before the GUI 220 was presented by the user device 100. In this example, if a user were to select the return thumbnail 230, the client device would present the ebook page 202 as shown in FIG. 2A. Additionally, the title bar 222 includes a drop down menu 228 that allows the user to select other summary views (e.g., bookmark view, etc.). For example, a user selecting "Bookmarks" in the drop down menu 228 is navigated to the summary view described below with reference to FIG. 2C. Similarly, a user selecting "Highlights & Notes" in the drop down menu 228 is navigated to the summary view described below with reference to FIG. 2D.

Figure 2C:
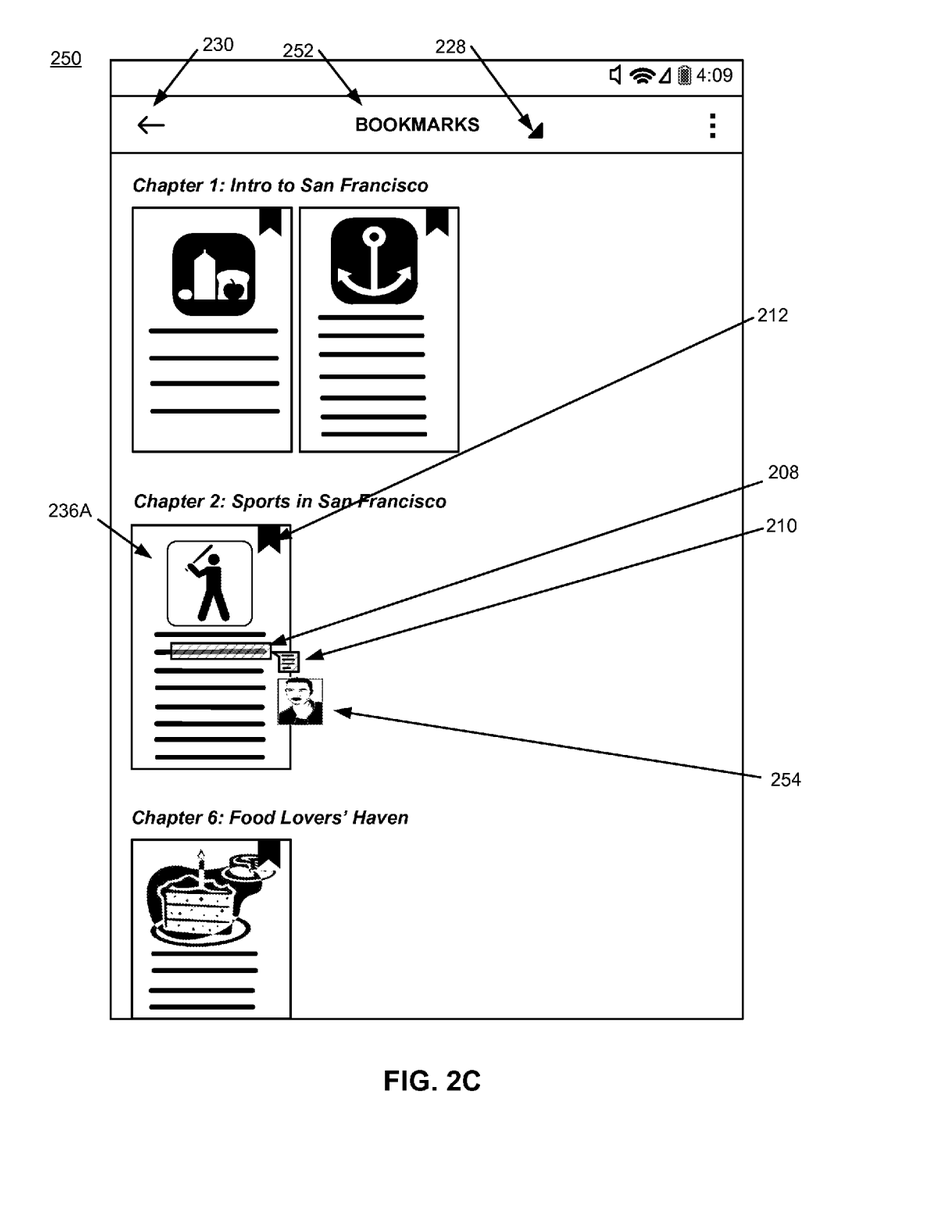
FIG. 2C illustrates an example of a graphical user interface showing a summary view, specifically, a bookmark view according to an embodiment.

FIG. 2C illustrates an example of a GUI 250 showing a summary view, specifically, a bookmark view 252, according to an embodiment. The GUI 250 is substantially the same as the GUI 220 and operates in substantially the same manner, except that the GUI 250 presents only segments including page thumbnails that are associated with bookmarked ebook pages. For example, in Chapter 2 there is only one ebook page that is bookmarked, accordingly, only the page thumbnail 236A associated with the bookmarked ebook page 202 is presented by the GUI 250. Thus, the bookmark view 252 allows the user to quickly navigate to bookmarked pages in the ebook. The page thumbnails displayed in the bookmark view 252 may also include other annotation information. The other annotation information may include, e.g., comments, highlights, user thumbnails, or some combination thereof.

Figure 2D:
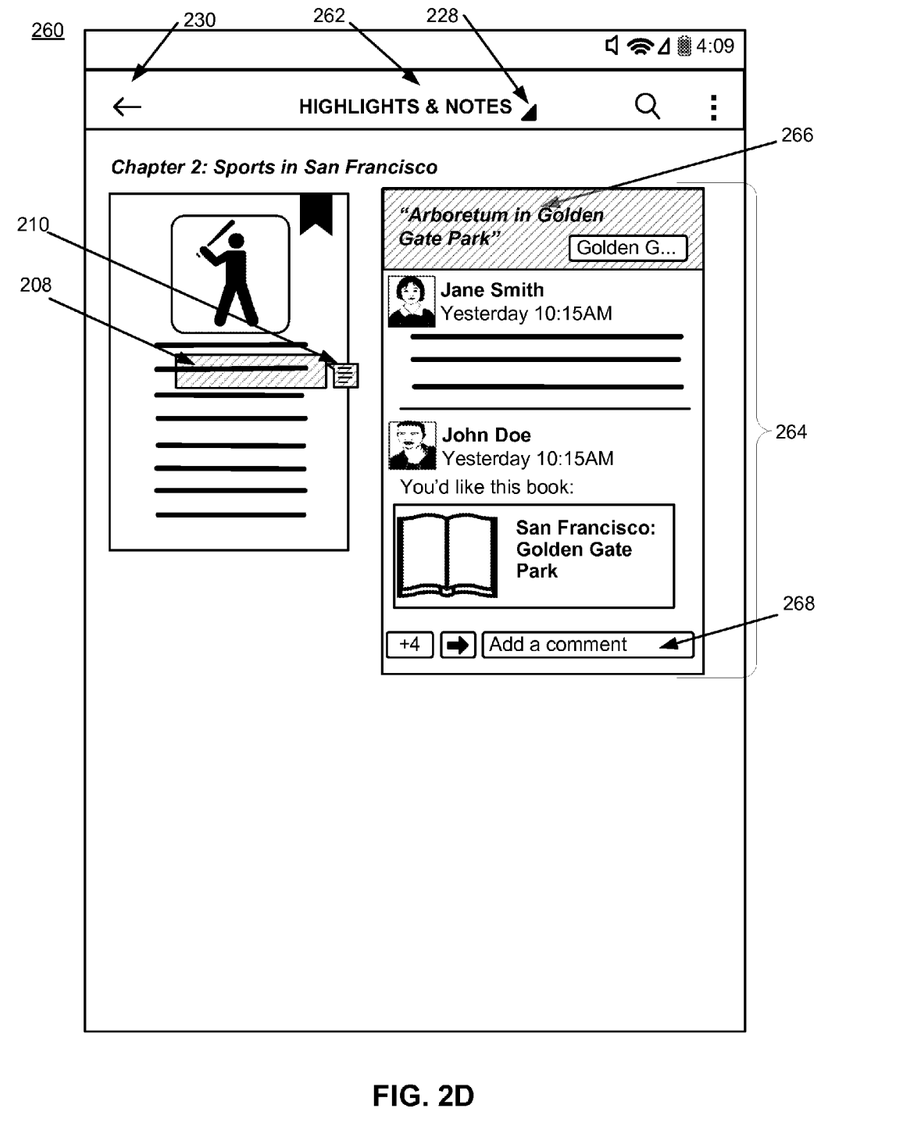
FIG. 2D illustrates an example of a graphical user interface showing a summary view, specifically, a highlights & notes view according to an embodiment.

FIG. 2D illustrates an example of a GUI 260 showing a summary view, specifically, a highlights & notes view 262 according to an embodiment. The GUI 260 is substantially the same as the GUI 220 and operates in substantially the same manner, except that the GUI 250 displays only segments that are associated with page thumbnails that have a highlighted portion and/or a comment. In this embodiment, the highlights & notes view 262 includes the drop down menu 228 and the return thumbnail 230. The comment thumbnail 210 is indicative of there being an associated comment window 264 that is available for display. In some embodiments, all comment windows 264 associated with comment thumbnails 210 on a displayed page thumbnail are displayed. In other embodiments, a user may select which comment windows 264 are displayed by selecting the associated comment window 264.

The GUI 260 displays comment windows associated with comments pertaining to one or more of the comment thumbnails 210. A comment window is a window that includes comments from one or more users that are associated with a highlighted portion of the ebook. In this example, the GUI 260 displays a comment window 264 that is associated with the highlighted portion 208 of the ebook. The comment window 266 may include a header that includes a portion of the text ("Arboretum in Golden Gate Park") that is highlighted in the highlighted portion 208 of the ebook.

The color and/or pattern of the header 266 may be matched to the color and/or pattern of the associated highlighted portion 208 and the comment thumbnail 210. The matching of color and/or pattern across associated highlighted portion, comment thumbnail 210, and header 266 assists users to quickly distinguish which comment windows 264 are associated with which highlighted portions 208 and comment thumbnails 210 in cases where there are multiple comments windows 264 associated with a page thumbnail.

The comment window 264 displays comments from the user and/or other users in accordance with the privacy settings of the user. The comment window 264 includes an add button 268 that allows the user to add a comment to the comment window 264. Thus, a user may create and/or participate in a dialog with other users within one or more comment windows.

Figure 3:
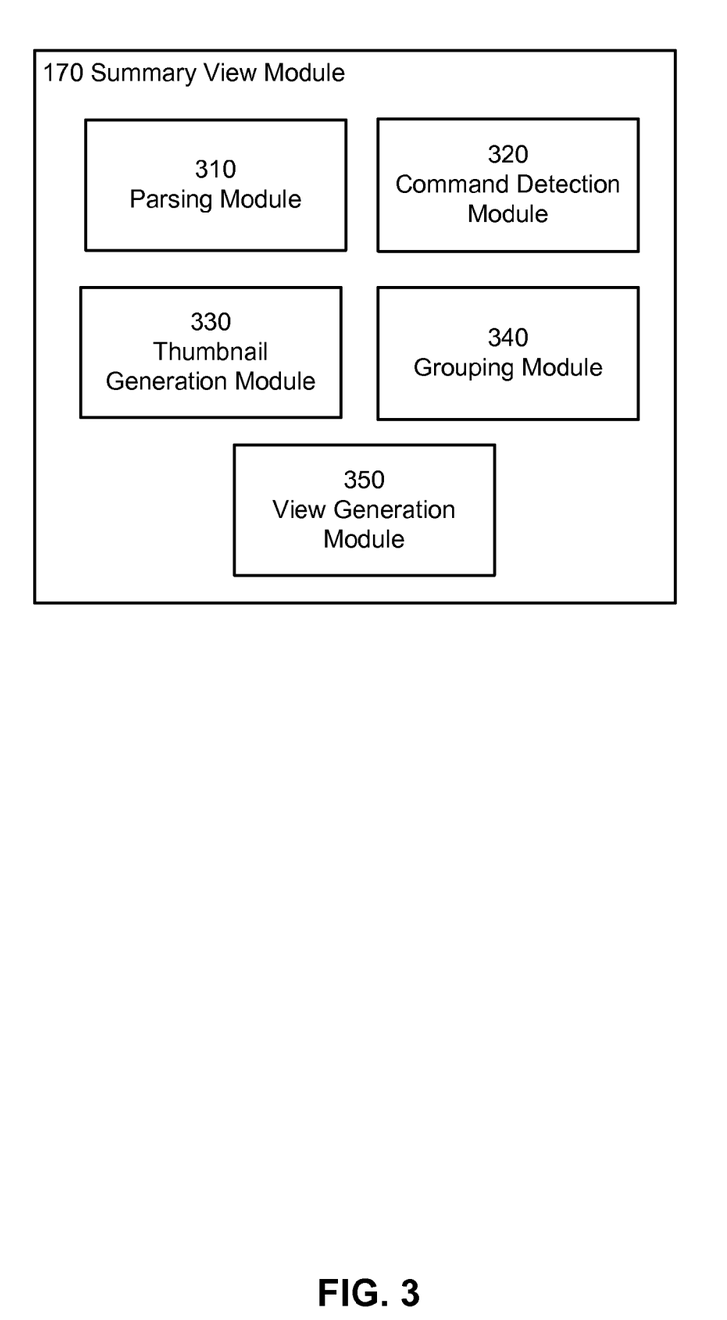
FIG. 3 is a high-level block diagram illustrating a detailed view of modules within a summary view module of a user device according to one embodiment.

Turning now to a discussion of the structure of the summary view module 170, FIG. 3 is a high-level block diagram illustrating a detailed view of modules within the summary view module 170 of a user device 100 according to one embodiment. Some embodiments of the summary view module 170 have different modules than those described here. Similarly, the functions can be distributed among the modules in a different manner than is described here. The summary view module 170 is comprised of modules including a parsing module 310, a command detection module 320, a thumbnail generation module 330, a grouping module 340, and a view generation module 350.

The parsing module 310 represents an ebook as a plurality of ebook pages associated with a plurality of segments. The parsing module 310 parses the ebook into ebook pages. The amount of ebook content in an ebook page may vary based in part on the area of the display available to present ebook content, the font size, and/or other factors. The parsing module 310 uses these factors to parses the ebook into ebook pages. FIG. 2A discussed above shows a single ebook page provided by the parsing module 310. The parsing module 310 provides one or more of such ebook pages to the ereader module 160 for presentation to the user.

The command detection module 320 detects summary view commands that are provided to the user device 100. As discussed above, with respect to FIG. 2A, summary view commands may be received via, e.g., gestures on a touch screen interface, selection of menu items, buttons on the user device 100, etc. The command detection module 320 analyzes the detected summary view command to determine what type of summary view is being requested for display. For example, a user tapping the displayed ebook page and/or pinching the displayed ebook page may indicate a request for a table of contents view. Whereas, a selection of a menu item may be used to request the bookmarks view and/or the highlights & notes view. The command detection module 320 provides the type of summary view requested to the thumbnail generation module 330 and/or other modules.

The thumbnail generation module 330 generates page thumbnails in accordance with the requested type of summary view. Generation of a page thumbnail refers to creation of a page thumbnail from an ebook page and/or retrieving a page thumbnail from the media database 140 and/or the media source 120.

The thumbnail generation module 330 generates page thumbnails for some or all of the ebook pages. In some embodiments, the thumbnail generation module 330 creates page thumbnails for all of the ebook pages when the ebook is first downloaded from the media source 120, a change in screen size is detected, a change in font is detected, a change in typeface is detected, annotations are added, change in the parsed ebook pages, or some combination thereof. Alternatively, the thumbnail generation module 330 receives the page thumbnails from the media source 120. The thumbnail generation module 330 stores the created and/or received page thumbnails in the media database 140. In some embodiments, the thumbnail generation module 330 generates the page thumbnails on an on-demand basis, where page thumbnails are generated in response to receipt of a summary view command. Note, in general changes in parsing of the ebook made by the parsing module 325 may cause the thumbnail generation module 330 to re-generate one or more page thumbnails.

The thumbnail generation module 330 generates the page thumbnails based in part on the type of summary view requested with the summary command. The thumbnail generation module 330 identifies the ebook pages for the requested type of summary view. If the type of the summary view is a bookmarks view, the thumbnail generation module 330 identifies ebook pages that have been bookmarked using annotation information associated with the ebook pages. Similarly, if the type of summary view is a highlights & notes view, the thumbnail generation module 330 identifies ebook pages that have highlighted portions and/or comments using annotation information associated with the ebook pages. In contrast, if the type of summary view is a table of contents view, all of the ebook pages are identified for generation of associated page thumbnails. In alternate embodiments, some, but not all of the ebook pages are identified for the generation of associated page thumbnails. For example, the thumbnail generation module 330 may identify only a portion of ebook pages within each segment for the generation of associated page thumbnails (e.g., every other page, ebook pages including subsection headings, etc.).

The thumbnail generation module 330 then generates page thumbnails for the identified ebook pages by creating a page thumbnail for each of the identified ebook pages and/or retrieving previously created page thumbnails that correspond to the identified ebook pages from the media database 140. In some embodiments, the thumbnail generation module 330 generates a page thumbnail for an ebook page, by creating a smaller version of the ebook page (e.g., by scaling down the size of the image), and the smaller version of the ebook page is used as the page thumbnail associated with the ebook page. For example, a page thumbnail may be a 40% smaller version of the ebook page. In some embodiments, the thumbnail generation module 330 retrieves annotation information from the media database 140 and/or the ebook annotation server 130, and annotates the generated page thumbnail such that some or all of the annotations associated with an ebook page are visible on the page thumbnail.

The grouping module 340 groups the generated page thumbnails by segment. The grouping module 340 identifies one or more segments within the ebook that are associated with the generated page thumbnails. For example, if the requested summary view is for a bookmarks view, the page thumbnails may only be associated with a few of the segments in which a user has bookmarked an ebook page. The grouping module 340 may identify segments that are associated with the generated page thumbnails using the segment IDs for the ebook pages that are associated with the page thumbnails. The grouping module 340 then groups the generated page thumbnails by identified segment. For example, if the segment is Chapter 1 of an ebook, the grouping module 340 would group any page thumbnails associated with the ebook pages in Chapter 1 with the segment. The grouping module 340 groups the page thumbnails that are associated with a segment in the same order as their corresponding ebook pages. For example, if the generated page thumbnails correspond to ebook pages 3 and 6, respectively, in Chapter 1 of the ebook, the page thumbnail associated with ebook page 3 would be placed before the page thumbnail associated with ebook page 6.

The view generation module 350 generates a GUI for the requested type of summary view using the grouped page thumbnails. The GUI lists the identified segments, and the grouped page thumbnails associated with each identified segment. In some embodiments, the view generation module 350 lists the identified segments vertically and lists horizontally page thumbnails that are part of the group associated with that segment. Examples of GUIs showing a table of contents view, a bookmark view, and a highlights & notes view, are discussed above with reference to FIGS. 2B, 2C, and 2D. The generated GUI may include a drop down menu that allows a user to select other summary views.

In some embodiments, the view generation module 350 generates a comment window for one or more comments associated with the page thumbnail. The view generation module 350 generates a comment window using annotation information associated with a page thumbnail. For example, the view generation module 350 may generate a comment window for a page thumbnail if the requested summary view is a highlights and notes view. As discussed above with reference to FIG. 2D, the comment window includes comments from one or more users that are associated with a highlighted portion of the ebook. Additionally, the comment window may allow a user to comment on a portion of the ebook and/or respond to other users' comments on the portion of the ebook.

In some embodiments, the view generation module 350 may scale the size of the displayed page thumbnails based on, e.g., the type of summary view requested. For example, page thumbnails in a bookmark view and/or highlights and notes view may be significantly larger than page thumbnails displayed in a table of contents view.

In some embodiments, the view generation module 350 emphasizes the page thumbnail associated with the ebook page that was being presented by the user device 100 when the summary view command was received. The view generation module 350 may emphasize a page thumbnail by, e.g., making the page thumbnail slightly larger than other page thumbnails, highlighting the page thumbnail, bolding a border of the page thumbnail, otherwise distinguish the page thumbnail from other page thumbnails, or some combination thereof. The emphasized page thumbnail may help a user maintain their reading location in the ebook while they navigate elsewhere in the ebook using one or more of the summary views.

The view generation module 350 presents the generated GUI to the user. The generated GUI may be responsive to commands received from a user via the user device 100. For example, the user may scroll (e.g., vertically) through various segments and/or scroll (e.g., horizontally) through various page thumbnails associated with a particular segment. As the page thumbnails are smaller versions of the actual ebook page, a user is able to easily discern the content of an ebook page using an associated page thumbnail, and navigate to the ebook page simply by selecting (e.g., tapping on the page thumbnail) the page thumbnail.

Figure 4:
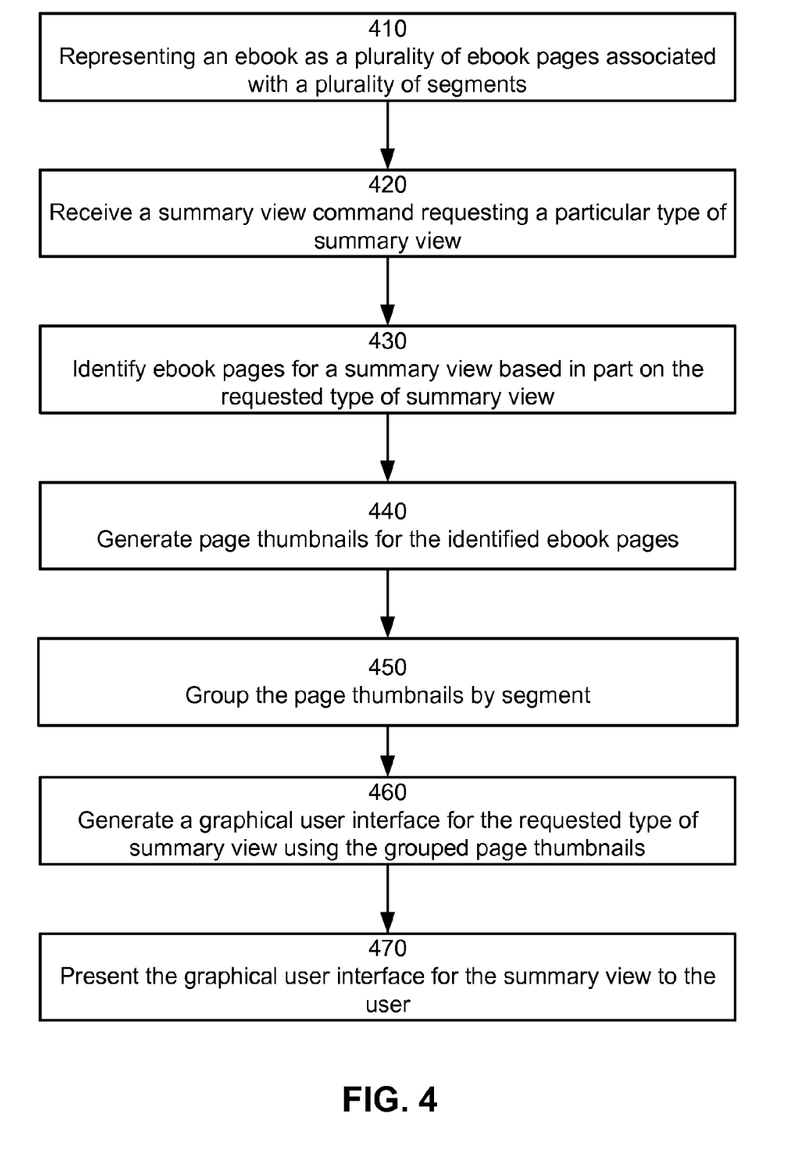
FIG. 4 is a flowchart illustrating a process of generating graphical user interfaces showing summary views that facilitate navigation of ebooks according to one embodiment.

FIG. 4 is a flowchart illustrating a process of generating graphical user interfaces showing summary views that facilitate navigation of ebooks according to one embodiment. In one embodiment, the process of FIG. 4 is performed by the user device 100. Other entities may perform some or all of the steps of the process in other embodiments. Likewise, embodiments may include different and/or additional steps, or perform the steps in different orders.

The user device 100 represents 410 an ebook as a plurality of ebook pages associated with a plurality of segments. The user device 100 parses the ebook into ebook pages for presentation to the user. The user device 100 presents a portion of the ebook to the user including one or more ebook pages.

The user device 100 receives 420 a summary view command requesting a particular type of summary view. The summary view command may be received from the user via, for example, a gesture, selection of a soft button, a menu selection, selection of a button on the user device 100, etc.

The user device 100 identifies 430 ebook pages for a summary view based in part on the requested type of summary view. For example, if the requested type of summary view is a table of contents, the user device 100 may identify all the ebook pages for the summary view. In contrast, if the requested type of summary view is a bookmarks view or a highlights & notes view, the user device 100 identifies ebook pages for the summary view by determining which ebook pages have the associated types of annotation information.

The user device 100 generates 440 page thumbnails for the identified ebook pages. In some embodiments, user device 100 creates and/or retrieves page thumbnails (e.g., from the media database 140 and/or the media source 120) for the identified pages.

Additionally, in some embodiments, the user device 100 retrieves annotation information from the media database 140 and/or the ebook annotation server 130 for one or more identified ebook pages. In some embodiments, the user device 100 annotates the identified ebook pages prior to generating page thumbnails such that some or all of the annotations associated with the ebook pages are visible on the page thumbnails. In other embodiments, the user device 100 annotates the generated page thumbnails.

The user device 100 groups 450 the page thumbnails by segment. The user device 100 identifies one or more segments within the ebook that are associated with the generated page thumbnails using, e.g., the segment IDs for the ebook pages associated with the page thumbnails. The user device 100 then groups the generated page thumbnails by identified segment.

The user device 100 generates 460 a summary view GUI for the requested type of summary view using the grouped page thumbnails. The user device 100 may, e.g., generate a GUI for a table of contents view, a bookmark view, or a highlights & notes view. The GUI vertically lists identified segments, and horizontally lists page thumbnails associated with each identified segment. The user device 100 presents 470 the graphical user interface for the summary view to the user.

Turning now to a discussion of the implementation of the generation and presentation of summary views for navigation of media items discussed above, FIG. 5 is a high-level block diagram illustrating an example computer 500 for implementing the entities shown in FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input interface 514, and network adapter 516 are coupled to the I/O controller hub 522. Other embodiments of the computer 500 have different architectures.

Figure 5:
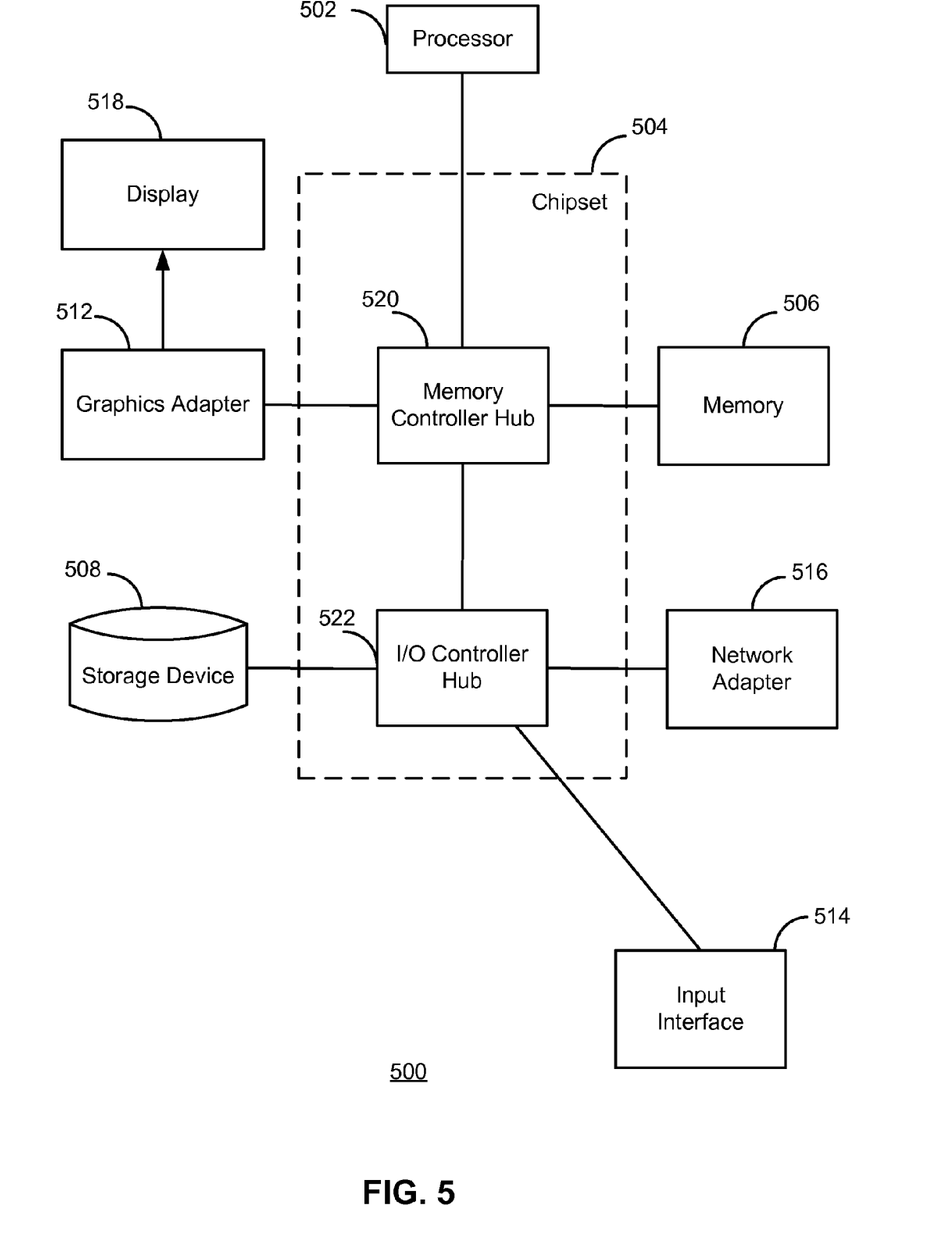
FIG. 5 is a high-level block diagram illustrating an example computer for implementing the entities shown in FIG. 1.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The computers 500 monitors gestures made by the user and converts them into commands (e.g., scroll horizontally, scroll vertically, summary view command, selection of a page thumbnail, etc.) The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. For example, the user device 500 may interact with one or more servers working together to provide the functionality described herein. The computers 500 can lack some of the components described above, such as keyboards, graphics adapters 512, and displays 518.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating graphical user interfaces for summary views that facilitate navigation of ebooks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for generating graphical user interfaces showing summary views that facilitate navigation of ebooks, comprising:
   representing an ebook as a plurality of ebook pages associated with a plurality of segments;
   receiving a summary view command from a user, the summary view command requesting a particular type of summary view of a predefined set of summary views, each predefined type of summary view having associated predefined page criteria identifying types of ebook pages associated with the type of summary view;
   identifying one or more ebook pages, of the plurality of ebook pages, having metadata indicating that the ebook pages satisfy the predefined page criteria for the selected summary view;
   generating page thumbnails for each of the identified one or more ebook pages, wherein the page thumbnail is associated with the same segment as the associated ebook page;
   grouping the generated page thumbnails by segment, using the plurality of segments;

generating a summary view graphical user interface (GUI) for the requested type of summary view using the grouped page thumbnails, the summary view GUI vertically listing one or more segments, of the plurality of segments, and horizontally listing page thumbnails associated with the one or more segments; and displaying the summary view GUI.

2. The method of claim 1, wherein identifying one or more ebook pages, of the plurality of ebook pages, having metadata indicating that the ebook pages satisfy the predefined page criteria for the selected summary view further comprises:

identifying the plurality of the ebook pages as the one or more ebook pages.

3. The method of claim 1, wherein identifying one or more ebook pages, of the plurality of ebook pages having metadata indicating that the ebook pages satisfy the predefined page criteria for the selected summary view further comprises:

determining, using annotation information, which ebook pages have been bookmarked; and identifying the bookmarked ebook pages as the one or more ebook pages.

4. The method of claim 1, wherein identifying one or more ebook pages, of the plurality of ebook pages, having metadata indicating that the ebook pages satisfy the predefined page criteria for the selected summary view further comprises:

determining, using annotation information, which ebook pages are annotated ebook pages that include a highlighted portion, a commented portion, or both; and identifying the annotated ebook pages as the one or more ebook pages.

5. The method of claim 1, wherein grouping the generated page thumbnails by segment, using the plurality of segments further comprises:

identifying one or more segments within the ebook that are associated with the generated page thumbnails; and grouping the generated page thumbnails by identified segment, such that each of the one or more identified segments is associated with at least one generated page thumbnail.

6. The method of claim 1, wherein displaying the summary view GUI further comprises:

displaying a plurality of page thumbnails associated with a segment of the plurality of segments, where the segment is also associated with at least one page thumbnail that is outside a display area of the user device; and wherein the method further comprises:

receiving a command from the user to horizontally scroll through page thumbnails associated with the segment; and scrolling the page thumbnails horizontally such that the at least one page thumbnail moves from outside the display area to within the display area.

7. The method of claim 1, wherein generating page thumbnails for each of the identified one or more ebook pages, further comprises:

retrieving annotation information for at least one of the identified one or more ebook pages; and generating a page thumbnail for the at least one identified ebook page such that some of the annotation information is displayed as part of the page thumbnail.

8. A non-transitory computer-readable storage medium storing executable computer program instructions for generating graphical user interfaces showing summary views that facilitate navigation of ebooks, the instructions executable to perform steps comprising:

representing an ebook as a plurality of ebook pages associated with a plurality of segments;

receiving a summary view command from a user, the summary view command requesting a particular type of summary view of a predefined set of summary views, each predefined type of summary view having associated predefined page criteria identifying types of ebook pages associated with the type of summary view;

identifying one or more ebook pages, of the plurality of ebook pages, having metadata indicating that the ebook pages satisfy the predefined page criteria for the selected summary view;

generating page thumbnails for each of the identified one or more ebook pages, wherein the page thumbnail is associated with the same segment as the associated ebook page;

grouping the generated page thumbnails by segment, using the plurality of segments;

generating a summary view graphical user interface (GUI) for the requested type of summary view using the grouped page thumbnails, the summary view GUI vertically listing one or more segments, of the plurality of segments, and horizontally listing page thumbnails associated with the one or more segments; and displaying the summary view GUI.

9. The computer-readable medium of claim 8, wherein identifying one or more ebook pages, of the plurality of ebook pages, having metadata indicating that the ebook pages satisfy the predefined page criteria for the selected summary view further comprises:

identifying the plurality of the ebook pages as the one or more ebook pages.

10. The computer-readable medium of claim 8, wherein identifying one or more ebook pages, of the plurality of ebook pages, having metadata indicating that the ebook pages satisfy the predefined page criteria for the selected summary view further comprises:

determining, using annotation information, which ebook pages have been bookmarked; and identifying the bookmarked ebook pages as the one or more ebook pages.

11. The computer-readable medium of claim 8, wherein identifying one or more ebook pages, of the plurality of ebook pages, having metadata indicating that the ebook pages satisfy the predefined page criteria for the selected summary view further comprises:

determining, using annotation information, which ebook pages are annotated ebook pages that include a highlighted portion, a commented portion, or both; and identifying the annotated ebook pages as the one or more ebook pages.

12. The computer-readable medium of claim 8, wherein grouping the generated page thumbnails by segment, using the plurality of segments further comprises:

identifying one or more segments within the ebook that are associated with the generated page thumbnails; and grouping the generated page thumbnails by identified segment, such that each of the one or more identified segments is associated with at least one generated page thumbnail.

13. The computer-readable medium of claim 8, wherein displaying the summary view GUI further comprises:

displaying a plurality of page thumbnails associated with a segment of the plurality of segments, where the segment is also associated with at least one page thumbnail that is outside a display area of the user device; and wherein the method further comprises:
  receiving a command from the user to horizontally scroll through page thumbnails associated with the segment; and
  scrolling the page thumbnails horizontally such that the at least one page thumbnail moves from outside the display area to within the display area.

14. The computer-readable medium of claim 8, wherein generating page thumbnails for each of the identified one or more ebook pages, further comprises:
  retrieving annotation information for at least one of the identified one or more ebook pages; and
  generating a page thumbnail for the at least one identified ebook page such that some of the annotation information is displayed as part of the page thumbnail.

15. A device for generating graphical user interfaces showing summary views that facilitate navigation of ebooks, comprising:
  a processor configured to execute modules; and
  a memory storing the modules, the modules comprising:
    a parsing module configured to represent an ebook as a plurality of ebook pages associated with a plurality of segments; and
    a command detection module configured to receive a summary view command from a user, the summary view command requesting a particular type of summary view of a predefined set of summary views, each predefined type of summary view having associated predefined page criteria identifying types of ebook pages associated with the type of summary view; and
    a thumbnail generation module configured to:
      identify one or more ebook pages, of the plurality of ebook pages, having metadata indicating that the ebook pages satisfy the predefined page criteria for the selected summary view, and
      generate page thumbnails for each of the identified one or more ebook pages, wherein the page thumbnail is associated with the same segment as the associated ebook page; and
    a grouping module configured to group the generated page thumbnails by segment, using the plurality of segments;
    a view generation module configured to:
      generate a summary view graphical user interface (GUI) for the requested type of summary view using the grouped page thumbnails, the summary view GUI vertically listing one or more segments, of the plurality of segments, and horizontally listing page thumbnails associated with the one or more segments, and
      display the summary view GUI.

16. The device of claim 15, wherein the thumbnail generation module is further configured to:
  identify the plurality of the ebook pages as the one or more ebook pages.

17. The device of claim 15, wherein the thumbnail generation module is further configured to:
  determine, using annotation information, which ebook pages have been bookmarked; and
  identify the bookmarked ebook pages as the one or more ebook pages.

18. The device of claim 15, wherein the thumbnail generation module is further configured to:
  determine, using annotation information, which ebook pages are annotated ebook pages that include a highlighted portion, a commented portion, or both; and
  identify the annotated ebook pages as the one or more ebook pages.

19. The device of claim 15, wherein the grouping module is further configured to:
  identify one or more segments within the ebook that are associated with the generated page thumbnails; and
  group the generated page thumbnails by identified segment, such that each of the one or more identified segments is associated with at least one generated page thumbnail.

20. The device of claim 15, wherein the view generation module is further configured to:
  display a plurality of page thumbnails associated with a segment of the plurality of segments, where the segment is also associated with at least one page thumbnail that is outside a display area of the user device;
  receiving a command from the user to horizontally scroll through page thumbnails associated with the segment; and
  scroll the page thumbnails horizontally such that the at least one page thumbnail moves from outside the display area to within the display area.

* * * * *